Jan. 14, 1964  J. E. BELLINGER, JR  3,118,024
AUTOMATIC SWITCHING MECHANISM INCLUDING LATCHING MEANS
Filed Feb. 25, 1959  2 Sheets-Sheet 1
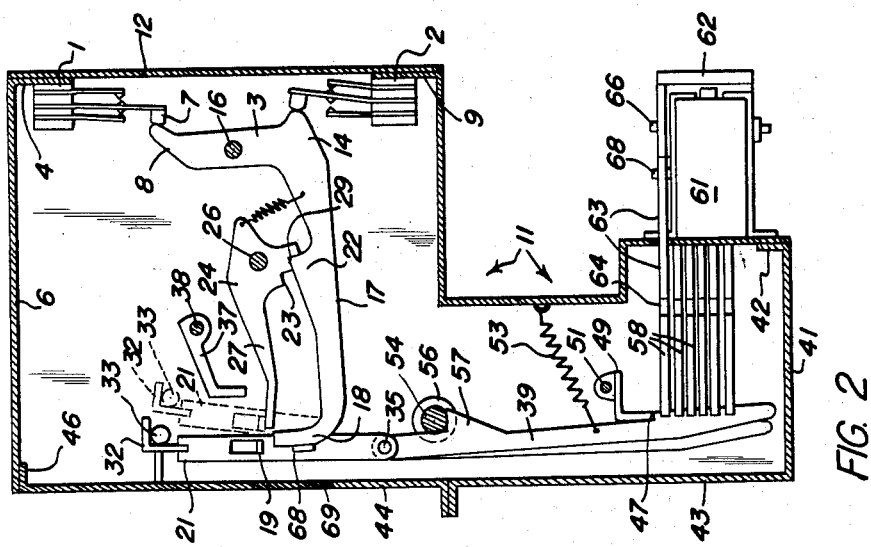
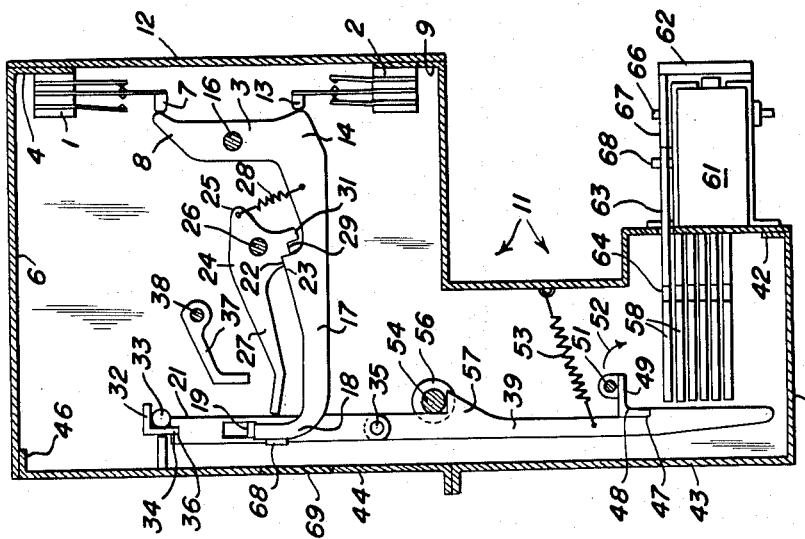
INVENTOR
JAMES E. BELLINGER, JR.
BY *Hurvitz & Rose*
ATTORNEYS Jan. 14, 1964  J. E. BELLINGER, JR  3,118,024
AUTOMATIC SWITCHING MECHANISM INCLUDING LATCHING MEANS
Filed Feb. 25, 1959  2 Sheets-Sheet 2

INVENTOR
JAMES E. BELLINGER, JR.
BY Hurvitz + Rose
ATTORNEYS 3,118,024
Patented Jan. 14, 1964

3,118,024
AUTOMATIC SWITCHING MECHANISM
INCLUDING LATCHING MEANS
James E. Bellinger, Jr., Eau Gallie, Fla., assignor to Soroban Engineering, Inc., Melbourne, Fla., a corporation of Florida
Filed Feb. 25, 1959, Ser. No. 795,400
13 Claims. (Cl. 200—5)

The present invention relates to switching mechanisms and more particularly to an automatic switching mechanism for selectively actuating one or more of a plurality of switches in accordance with coded control information.

The apparatus of the present invention is intended to be utilized to control the programming of a plurality of inter-dependent operations and is primarily intended automatically to turn on or turn off one or more independent electrical circuits at predetermined times in accordance with recorded control information so as to exercise control over interrelated steps in a process or other multi-step operations. Although the system of the present invention has wide applicability in all fields of control, it is believed to be particularly applicable to the control of relatively complex processes such as in manufacturing processes involving the performance of a large number of inter-related operations upon a specific item or body of material. Thus, the apparatus may be employed in the chemical industry for controlling the times of initiation and termination of the flow of materials to and from mixing chambers and further, for the control of the temperatures and the pressures therein.

In order to perform the widely diversified operations to which the apparatus is to be applied, it must permit completely independent control of a plurality of electrical circuits and further permit complete flexibility of control over each of the circuits. Further, the apparatus must be reliable, and therefore should preferably employ a minimum number of rugged and therefore long-lived components for performing each of the independent switching functions. Still further, in order to produce an economical product, the switching and control elements should be capable of economical fabrication and therefore should preferably comprise elements having simple configurations and relatively loose tolerances.

It is therefore a primary object of the present invention to provide an automatic switching mechanism which is economical and rugged and yet which provides complete flexibility in selection of one of a plurality of switching functions.

It is another object of the present invention to provide a simple and economic automatic switching mechanism for selectively controlling the actuation of one of a large number of contacts and further including a polarity selection mechanism which permits contacts to be held for indefinite time intervals and to permit the selective release of the contact after any desired interval of time.

It is another object of the present invention to provide an automatic switching mechanism having complete flexibility in the actuation and release of the plurality of switch elements and which is simple and economical and employs a minimum number of rugged and relatively easily fabricated elements.

It is another object of the present invention to provide an automatic switching mechanism having complete flexibility in the actuation and release of plurality of switches and employing standard Teletype selection techniques for determining which one of the plurality of switches is to be operated upon and whether the switch is to be actuated or released during any cycle of operation.

It is an other object of the present invention to provide an automatic switching mechanism which provides complete flexibility in the actuation and release of a large plurality of switches and which is unusually small in size and rugged in construction.

In accordance with the present invention conventional Teletype decoding equipment is utilized to decode incoming information and to actuate, as determined by an incoming code, one of a large number of switches. The conventional Teletype decoding apparatus includes a plurality of permutation or selector bars having different configurations of grooves formed in adjacent surfaces of all of the bars such that upon movement of the bars in response to an incoming code group, a single aligned groove is formed in all of the surfaces of the bar to permit the entry therein of one seeker of a plurality of seekers. The seeker thus selected imparts movement to a switch actuator bail which actuates an associated switch actuator to operate one or a plurality of switches associated with the selected actuator. Each seeker is associated with a distinct switch actuator bail and switch actuator and plurality of switches so that by selecting a particular seeker in accordance with an incoming code group, a predetermined switch or set of switches is actuated to one of a number of different positions.

A latch is provided for each of the switch actuators so that the actuator and associated switches may be held in an actuated position and maintained therein for any selectable period as determined by the spacing between the incoming code calling for switch actuation and an incoming code calling for release of the latch associated with the switch. Release of the switch is effected by the seeker and code actuator bail mechanism in conjunction with a further selection apparatus. Specifically, the switch actuator bail is movable between a position in which it contacts the switch actuator upon movement of its associated seeker or release the actuator latch upon movement of its associated seeker. The mechanism for shifting the switch actuator bail, hereinafter referred to as the polarity selector bail, between the two aforesaid positions in common to all switch actuator bails but since only a single switch actuator bail is selected in response to each incoming code, only one of the switches is released during each code interval. Thus, complete flexibility of selection and release is provided and a switch may be actuated during one interval and released immediately thereafter during the next interval of operation or may be maintained in an actuated position for any length of time. Each actuator may control one or a plurality of switches and the number of actuators and switches is completely flexible, being limited only by the number of selector bars and associated seekers provided in a particular system. If the system is made responsive to an eight position code then, in one example, the apparatus may control the operation of $2^8$ number of switches times the number of switches controlled by each switch actuator. One position in each code location, however, may be employed to control the position of the polarity selector bail, and therefore is employed to determine whether the switch is to be actuated or its latch is to be released. In addition, there is provided a reset bail which, when actuated, releases all of the actuator latches and therefore returns all parts of the mechanism to their initial or starting conditions.

The actual switch control mechanism in addition to the standard Teletype-like selection apparatus comprises only four elements for each switch or group of switches associated with each seeker and these includes the switch actuator bail, the switch actuator, the actuator latch and a spring. In addition, there is required a reset bail and its operating magnet and a polarity selector bail and its operating magnet which are common to all switch stations.

In a specific embodiment of the present invention a device may be provided in which fifty distinct switching stations may be accommodated in a device having a volume of 6 inches by 6 inches by 14 inches.

Another important feature of the present invention is the fact that an operator may, at any time, readily determine the condition of the switch or switches at any switch location. More particularly, the position of the contact actuator is a ready indication of the condition of its associated switches and each actuator may be provided with an indicator which may be viewed through a transparent window in front of the mechanism. Therefore, the operator need only to glance through the window to determine the condition of his entire process or any element or segment thereof at that particular instant.

It is therefore another object of the present invention to provide an automatic switching mechanism for selectively controlling one of a plurality of different switch functions in which the condition of all switches in the apparatus is visually determinable by a human operator.

It is yet another object of the present invention to provide an automatic switching system for selectively actuating one of a large plurality of independent switches which system utilizes only four physical elements per switch station in addition to the station selection mechanism.

The above and still further objects, features and advantages of the present invention will become apparent upon consideration of the following detailed description of one specific embodiment thereof, especially when taken in conjunction with the accompanying drawings, wherein:

FIGURE 1 is a cross-sectional view in elevation of the apparatus taken parallel to the switch actuating elements;

FIGURE 2 is the same cross-sectional view illustrated in FIGURE 1 but illustrating the apparatus during a different period of the operating cycle.

Figure 3:
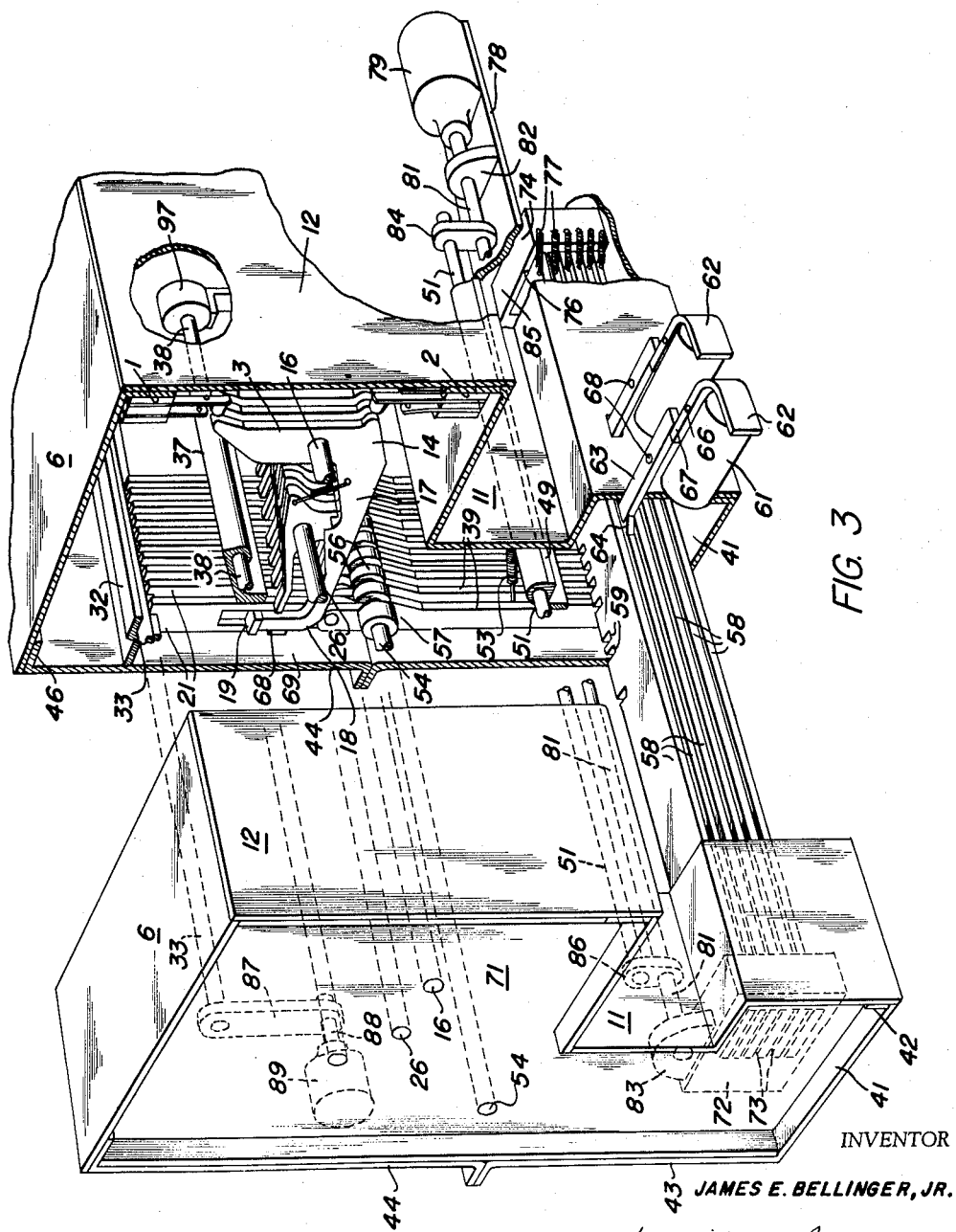
FIGURE 3 is a perspective view of the entire apparatus of the invention taken from one side and the rear of the machine.

Referring specifically to FIGURES 1 and 2 of the accompanying drawings, there is illustrated the basic apparatus essential to producing switching functions in accordance with an incoming permutation code. The apparatus comprises a plurality of pairs of switches, each pair including switches 1 and 2. The switches 1 and 2 are adapted to be actuated simultaneously by the heel and toe, respectively, of a switch actuator 3, this arrangement being employed to permit staggering of the switches so as to minimize space requirements. The plurality of pairs of switches constitute the final controlled elements of the apparatus; that is, the elements which the apparatus is designed to selectively control. The switches 1 and 2 may take any form but are illustrated for the purposes of example only as single-pole, double-throw, leaf-spring-type switches. Obviously, micro switches or other switches could be employed and single-pole, single-throw or double-pole switches, etc., could also be utilized. Further the leaf contact type switches can be stacked in the method common to relay practice so as to control a vast number of circuits. Each type of switch which may be employed has applicability in a particular type of system to which the apparatus may be applied.

The switches 1 are secured in a row to a downwardly depending flange 4 of a top cover member 6 of the apparatus, each switch having an actuator 7 disposed in engagement with an upwardly extending member 8 of a distinct switch actuator 3. The plurality of switches 2 are arranged in a row across the back of the machine on an upwardly extending flange 9 of a rear wall member, generally designated by the reference numeral 11, with the flange 9 being disposed below but spaced from the downwardly depending flange 4 of the top cover 6. A rear plate 12 bridges the opening between the flanges 4 and 9 and completes the rear enclosure of the apparatus.

The switches 2 each have an actuator 13 disposed in contact with a lower section 14 of the contact actuator 3. Each of the contact actuators 3 is pivotally secured to a common shaft 16 at a region approximately midway between the extremities of the section 8 and 14 of the contact actuator 3. Each actuator 3, as will be explained subsequently, is rotatable counterclockwise relative to its position illustrated in FIGURE 1 and as such as adapted, in the embodiment of the invention illustrated, to open one set of contacts on each of the switches 1 and 2 and close a different set of contacts on each of the switches. More particularly the actuator 7 of switch 1 is permitted to move to the left as viewed in FIGURE 1 and the actuator 13 of the switch 2 is pressed toward the right also as viewed in FIGURE 1 of the accompanying drawings.

Each contact actuator 3 further comprises an arm 17 extending to the left as illustrated in all figures of the drawings and terminates in an upwardly extending shoe 18 disposed immediately under a shoulder 19 on actuator bail 21. Each contact actuator 3 is provided on its upper surface, as illustrated in the drawings, with a right angle projection 22 formed by the intersection of two upwardly but oppositely directed surfaces. The shoulder 22 seats, in the position of the apparatus illustrated in FIGURE 1, in a right hand recess 23 formed in the lower surface of a latch member 24. Each latch 24 is pivoted about a common shaft 26 in a region substantially immediately above the recess 23 formed on the lower surface and further comprises an arm 27 extending to the left of the shaft 26 and into a region immediately adjacent the upwardly extending shoe 18 of its associated contact actuator 3. In the arrangement where the projection 22 is seated in the recess 23 in the latch 24, the left end of each arm 27 assumes a vertical position level with that assumed by the upper surface of each shoe 18 when it is depressed due to downward movement of its associated actuator bail 21 as described subsequently. Each latch 24 is provided with a segment 25 extending to the right of the shaft 26 which segment is coupled by means of a spring 28 to its associated contact actuator 3 intermediate the shaft 16 and the projection 22. Thus, upon downward movement of the actuator 3, the spring force tending to rotate the latch 24 clockwise about its shaft 26 is increased.

Below and to the right of the recess 23 in the latch 24, there is formed a second right angle recess 29 which is also adapted to receive the projection 22 in the actuator 3. The apparatus is such that upon downward movement of the shoe 18 of an actuator 3 in response to movement of the actuator bail 21, the projection 22 is removed from the recess 23 of the latch 24 and the latch 24 is rotated until the projection 22 of actuator 3 is seated in the recess 29; the rear of the recess defining a member 31 which prevents further rotation of the latch 24 upon engagement with the projection 22. This condition, that is, with the projection 22 seated in the recess 29, is illustrated in FIGURE 2 of the accompanying drawings and it is seen that under this set of circumstances the actuator 3 is retained in its downwardmost position with the switches 1 and 2 in the condition opposite to that assumed before the actuator 3 was depressed. It will be noted that rotation of the latch 24 into the position illustrated in FIGURE 2 brings the arm 27 thereof into a horizontal position which is approximately aligned with the vertical position of the upper surface of the shoe 18 in its unactuated position as illustrated in FIGURE 1.

In order to selectively reset the contact actuator 3; that is, permit the actuator 3 to return from the position illustrated in FIGURE 2 to the position illustrated in FIGURE 1, there is provided a polarity selector bail 32 which comprises a right angle member secured to a shaft 33. The bail 32, which is common to all of the actuator bails 21, has a downwardly depending leg 34 extending into a relatively deep groove 36 formed in the upper surface of the actuator bail 21. The depth of the groove 36 and the length of the leg 34 of the bail 32 extending thereinto is such that downward movement of the actuator bail 21, in response to its selection, is insufficient to cause the leg 34 to be withdrawn from the groove 36. Each actuator bail 21 is pivoted about a distinct pivot pin 35 passing through its lower end and the polarity selector bail 32 is adapted to be moved to the right as illustrated in FIGURES 1 and 2, to cause each actuator bail 21 to pivot about its respective pin 35, and to assume a position as indicated by the dotted line member 21 in FIGURE 2. In this position the shoulder 19 on the bail 21 is disposed immediately above the end of the arms 27 of the latch 24 and thus, upon downward movement of the actuator bail 21 in response to the selection thereof by an incoming code, a latch 24 is caused to rotate counterclockwise about its shaft 26. The counterclockwise rotation of the latch 24 causes the projection 22 of the contact actuator 3 to be removed from the recess 29 and to again become disposed in the recess 23. As a result, the contact actuator 3 is permitted to rotate clockwise about its shaft 26 in response to the spring force supplied by the spring 28 and returns to the position illustrated in FIGURE 1 of the accompanying drawings. The movement of the polarity selector bail 32 to the right as viewed in FIGURES 1 and 2 is effective to reset only one of the latch members 24 and contact actuators 3 since only one of the actuator bails 21 is pulled down at a time. In order to be able to effect resetting of all of the members 3 and 24 simultaneously, such as at the end of a cycle of operation, there is provided a reset bail 37 which is a continuous member disposed above all of the actuators 24. The bail 37 is secured to a shaft 38 which is adapted to be rotated counterclockwise. Upon rotation of the shaft 38, the left end of the bail 37 rotates all of the latch members 24 counterclockwise about the shaft 26 and therefore produces unlatching of all of the latched contact actuators 3.

As previously indicated each of the actuator bails 21 is pivoted about an individual pivot pin 35 which passes through a lower end of each of the bails 21. The pivot pins 35 are employed to connect each actuator bail 21 to a distinct seeker 39, each of which is essentially a long, thin, metallic member extending generally vertically downward from the region of the pivot pin 35 to a region immediately adjacent the bottom wall 41 of the apparatus. The bottom wall 41 includes an upwardly turned rear flange 42 to which the lower end of the back wall member 11 may be secured and an upwardly extending front wall 43 which constitutes approximately the lower half of the front wall of the apparatus. The upper half of the front wall of the apparatus comprises a wall member 44 having a horizontal upper flange 46 and which extends under and to which may be secured the upper wall member 6. Each of the seekers 39 has a rearwardly extending shoulder 47 formed adjacent its lower end which shoulder is adapted to receive a vertical leg 48 of a seeker bail 49. The seeker bail 49 is rotatably supported on a shaft 51 which is adapted to be moved along a path of motion indicated by the arrow 52. Each of the seekers 39 is urged into engagement with the seeker bail 49 by a separate spring 53 extending between each of the seekers 39 and a section of the back wall of the apparatus 11. Each of the seekers 39 is rotatable about a common shaft 54 as a pivot; the shaft 54 having disposed thereon a plurality of spaced annuli 56. The spacing between each of the annuli 56 is substantially equal to the width, as viewed in FIGURE 3, of each of the seekers 39 so that a portion of the seeker is disposed between adjacent annuli 56 and the rear surface thereof contacts the shaft 54. Each of the seekers has a rearwardly extending, generally saw-tooth projection 57 which is adapted to engage the lower segment of the shaft 54 and to limit upward movement of the seeker 39.

Upon movement of the seeker bail 49 along the path indicated by the arrow 52; that is, initially toward the right as viewed in FIGURE 1, all of the seekers tend to rotate counterclockwise about the shaft 54 in order to follow the movement of the seeker bail 49. However, disposed immediately below the shoulder 47 of the seeker 39 and just to the right thereof are a plurality of horizontally extending and vertically arranged permutation or code bars 58. Each of the bars is a thin, flat and long member having a sufficient length, as viewed in FIGURE 3, to be disposed immediately in front of all of the seekers 39. Each of the bars 58 is provided with a different pattern of notches 59, see FIGURE 3, disposed in its front surface immediately adjacent the rear surface of the seeker 39. The bars are adapted to be selectively moved to the left as viewed in FIGURE 3 by electro-magnets 61 having armatures 62 which are adapted to engage pivoted arms 63. The magnets 61 are secured to the outside of the lowermost portion of the rear wall 11 of the apparatus and the arms 63 extend through the wall and into engagement with a projection 64 formed on the rear surface of the code or permutation bars 58. When an electro-magnet 61 is energized, and reference is made now particularly to FIGURE 3, the left end of its associated armature 62 is pulled toward the magnet and rotates about a pivot pin 66 so that the rearwardly extending arm 67 secured to the armature 62 produces counterclockwise rotation of the arm 63 about its pivot 68. Counterclockwise rotation of the arm 63, causes the arm to push against the projection 64 on the code bar 58 and move it to the left as viewed in FIGURE 3. Each of the code bars, and only six are illustrated in the accompanying drawings although any number may be employed as determined by the particular code being applied to the apparatus, is responsive to energization of a different magnet 61 and therefore selective movement of the bars may be accomplished in accordance with a predetermined pattern of voltage pulses applied to the electro-magnets 61. The voltage patterns applied to the magnets 61 may be of any prescribed form and may be derived from any desired source. Thus, a set of binary coded signals may be employed to move any pattern of bars 58 to the left and the signals may be derived from sources such as perforated cards or tape, magnetic tape, optical storage elements or from remote sources via telephone, telegraph or radio links.

Returning now to a description of the bars 58, the grooves 59 are formed in the front surfaces of the bars 58 in such a pattern that only one continuous vertical groove is formed in alignment with the path of movement of the seekers 39. In all seeker locations but one, at least one of the bars 58 presents an ungrooved or solid segment to the juxtaposed seeker. The operation of the permutation bars and seekers is well known in the telegraph art and further discussion of their operation is not believed to be required. It is sufficient to state that, in consequence of the above arrangement, upon movement of bail 49 first to the right all of the seekers 39 move to the right until they engage the code bars 58. All of the seekers, but one, come into engagement with a left hand surface of at least one of the bars 58 so that continued movement is prevented and the movement of the seeker bail 49 is sufficient to withdraw it from the shoulders 47 of all of the unselected bars. One of the seekers 39, as determined by the incoming code and specifically by the position of the one continuous vertical groove formed by alignment of the grooves of the bars 58, is permitted to follow the seeker bail 49 to its right hand most position. The upper surface of the shoulder 47 is maintained in engagement with the lower surface of the vertical leg 48 of the seeker bail 49. Upon downward movement of the bail 49, as indicated by the arrow 52, only the selected seeker 39 is moved downwardly therewith and pulls downwardly on its associated actuator bail 21 to produce the desired switching function. This situation is illustrated in FIGURE 2 where the forwardmost illustrated seeker 39 has passed into a continuous groove through the code or permutation bars 58 and is therefore maintained in contact with the seeker bail 49. The condition illustrated in FIGURE 2 with respect to this portion of the apparatus is at that portion of the interval when the seeker bail 49 has terminated a major portion of its right hand movement immediately prior to its major downward movement. The bail 49 has essentially two components of movement: The first component, and this occurs primarily at the beginning of its cycle of movement, is to the right as illustrated in FIGURES 1 and 2 and the second is essentially downward and has only a relatively small component of horizontal movement. When the bail 49 becomes disengaged from all but the selected seeker, the unselected seekers would normally tend to rise due to the upward component of force imparted to them by the springs 53. Such a rise must be limited so that when the bail 49 returns to the position illustrated in FIGURE 1, it reengages the shoulders 47 on the seekers 39. This limitation on upward movement is effected by the triangular projections 57 which engage the bottom of the shaft 54.

It is seen from the above that the apparatus of the invention relies upon a Teletype-like machine selector apparatus for selecting the particular pair of switches 1 and 2 which are to be operated upon or whose condition is to be altered at any particular interval during an operating cycle. By selectively energizing the magnets 61 in accordance with an incoming code, a particular seeker 39 is selected for downward movement and downward movement of the seeker alters a condition of the particular pair of switches 1 and 2 associated therewith. Further, by selective movement of the polarity selector bail 32, the actuator 3 may be caused to rotate counterclockwise if it was initially in its clockwisemost position or may be caused to be rotated clockwise if it were in its counterclockwise most position. Thus, the single selector bail effectively doubles the number of switching operations obtainable with the apparatus and further permits each switch to have two stable positions so that operations of indefinite time intervals may be programmed. Specifically, the switches 1 and 2 may be selectively caused to alter their present condition in order to effect the initiation and later at a prescribed time the termination of some externally controlled apparatus or mechanism.

As previously indicated, one of the primary objects of the invention is the provision of a mechanism in which an operator may at any time visually check the condition of the system and this may be accomplished in accordance with the present invention by placing a physical indicator 68, such as a tag, on the front of the shoe 18 of each of the contact actuators 3. The front wall 44 of the apparatus may be provided with a transparent window 69 immediately adjacent the indicators 68 so that by merely looking through the window 69, an operator may immediately determine the condition of an overall mechanism and any specific member at a glance.

The overall mechanism is illustrated in detail in FIGURE 3 and comprises in addition to that portion of the assembly already discussed a left end wall 71 in which is supported the shafts 16, 26, 38, and 54. A right endwall (which is not illustrated) or other suitable support means may be provided for the right end of these shafts. The code bars 58 are supported at their left ends by a support member 72 having a plurality of slots 73 with each slot receiving a different code bar 58. The right ends of the code bars 58 are guided by a support 74 also having slots 76 each for slidably securing a different one of the bars 58. A separate spring 77 is provided for each of the bars 58 to bias them to the right in opposition to the force applied thereto by the magnets 61.

A platform 78 is secured to the top of the support 74 and a rotary solenoid 79 is secured to the platform 78. The solenoid 79 has a shaft 81 rotatably supported in an upstanding plate 82 closely adjacent the solenoid 79 and in a further upstanding plate 83 secured to the top of the code bar support 72. The shaft 81 supports two upstanding lines 84 and 86 disposed adjacent plates 82 and 83 respectively, and secured to the shaft 81 for rotation therewith. The plates 84 and 86 rotatably support the shaft 51 of the bail 49 adjacent their upper ends and when the solenoid 79 is energized so as to rotate its shaft 81 clockwise as viewed in all figures, the shaft 51 follows the path indicated by arrow 52 in FIGURE 1. The drive mechanism for the shaft 51 may take many forms and the specific form illustrated is intended to be exemplary and not limiting.

Actuation of the polarity selective bail 32 is effected by movement of the shaft 33 secured to the bail. The shaft 33 is rotatably supported adjacent its ends by links 87, only one of which is illustrated. The links 87 extend downwardly from the shaft 33 and are secured adjacent their lower ends to a shaft 88 of a rotary solenoid 89. The solenoid 89 is supported on the end wall 71 and the shaft 88 is supported at its far end in the right hand end wall of the apparatus. Thus, when the solenoid 89 is energized, the link 87 is caused to rotate clockwise as viewed in FIGURE 3 and causes the shaft 33 and therefore the bail 32 to move in a clockwise direction. The solenoid 89 may be energized in response to a unit of input information specifically reserved for its control. Thus, if a seven level code is employed, six code elements control the magnets 61 and one code element may control the solenoid 89.

The left end of the shaft 38 of the reset bail 37, as viewed in FIGURE 3, is supported in the end wall 71; the shaft being an extension of the output shaft of a rotary solenoid 97. The rotary solenoid 97 is supported on or secured to the right end wall of the apparatus and upon its energization, the shaft 38 is rotated counterclockwise as viewed in FIGURES 1 and 2.

In operation of the device, all but one of the incoming coded information signals, and in the present invention since six code bars 58 are employed, a seven unit input code is utilized, are routed to the six electro-magnets 61 to selectively position the bars 58 in accordance with the appropriate code, and the seventh signal is routed to magnet 89. After the bars 58 and the bail 32 have been positioned, external circuitry, which forms no part of the present invention, energizes the rotary solenoid 79 to produce the prescribed movement of the shaft 51 in order to cause the bail 49 to pull downwardly on the selected seeker 39. The selected seeker 39 pulls downwardly on the attached actuator bail 21 to depress either the switch actuator 3 or the latch 24 depending upon the position of the polarity selector bail 32. After the desired switching action has been effected, the rotary solenoid 79 is de-energized and returns the seeker bail 49, the selected actuator bail 21 and all of the seekers 39 to their unactuated positions. When the bail 21 and seeker 39 have returned to their unactuated position the solenoid 89, if previously energized, and the energized magnets 61 are de-energized so that the system is ready to receive the next unit of coded information.

The entire apparatus illustrated in FIGURE 3 may define a volume of only 6 inches by 6 inches by 14 inches and therefore is extremely compact. Further, the system requires relatively few elements at each of the switching stations and more particularly, in addition to the normal telegraph type decoding mechanism, requires only the polarity selector bail 32, the reset bail 37, the latch 24 and the contact actuator 3 in addition to the switches themselves. Thus, the system is extremely simple and may be fabricated for the most part from standard and readily available mechanisms. The apparatus may operate at the speed of conventional telegraph machines; that is, at ten codes per second or may be operated at higher speeds if so desired.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A switching mechanism comprising a switch having different states, a switch actuator movable between at least a first and a second position, means for changing the state of said switch upon movement of said actuator between said positions, a latch means for releasably maintaining said actuator in said second position, a movable member shiftable between one and another position, means for moving said actuator from said first to said second position in response to a predetermined movement of said movable member while in said one position, means for releasing said latch means upon a predetermined movement of said movable member while in said another position and means for selectively shifting said movable member between said positions.

2. A switching mechanism comprising a plurality of switches having different states, a plurality of switch actuators movable between at least a first and a second position, a plurality of latches for releasably maintaining said actuators in said second position, there being a one-to-one operative correspondence between said switches, said actuators and said latches, each of said actuators being adapted to change the state of a different one of said switches upon movement from one to the other of said first and second positions, means for selectively moving each of said actuators from said first to said second position and means for releasing each of said latches when its associated actuator is moved when initially in said second position.

3. A switching mechanism comprising a plurality of switches having different states, a plurality of switch actuators movable between at least a first and a second position, a plurality of latches for releasably maintaining said actuators in said second position, there being a one-to-one operative correspondence between said switches, said actuators and said latches, each of said actuators being adapted to change the state of a different one of said switches upon movement from one to another position, a plurality of movable members each associated with a different one of said actuators and said latches, means for selectively moving each of said movable members in a first direction, means for selectively moving each of said movable members in a second direction between one and another position, means for moving each of said actuators to said second position upon movement of its associated movable member in said first direction when in said one position, and means for releasing each of said latches upon movement of its associated movable member in said first direction when in said another position.

4. The combination in accordance with claim 3 further comprising means for selectively releasing all of said latches substantially simultaneously.

5. The combination in accordance with claim 3 wherein said means for selectively moving each of said movable members in said first direction comprises a plurality of seekers each connected to a different one of said movable members, and permutation means responsive to coded control information for moving one of said seekers as determined by said coded information.

6. The combination in accordance with claim 5 further comprising means responsive to one unit of said coded control information for energizing said means for selectively moving all of said movable members in a second direction.

7. The combination in accordance with claim 5 wherein said permutation means comprises a plurality of code bars having a distinct arrangement of grooves in corresponding surfaces thereof, means for individually shifting said code bars parallel to said surfaces each in response to a distinct unit of coded control information, said grooves being arranged such that only one aligned groove is formed through all of said code bars along a path parallel to said seekers, and means for moving only the seeker aligned with the aligned grooves.

8. A switching mechanism comprising a switch having different states, a switch actuator movable between at least a first and a second position, means for changing the state of said switch upon movement of said actuator between said positions, a latch means for releasably maintaining said actuator in said second position, means for selectively moving said actuator from said first to said second position and means for releasing said latch means when said actuator is initially in said second position, said means for releasing comprising means for engaging and moving said actuator.

9. A switching mechanism comprising a switch having different states, a switch actuator movable between at least a first and a second position, means for changing the state of said switch upon movement of said actuator between said positions, a latch means for releasably maintaining said actuator in said second position, a bail member shiftable between a first and a second position and reciprocatable between said first position and a third position and between said second position and a fourth position, means for moving said actuator from said first to said second position upon movement of said bail member from said first to said third position and for releasing said latch means upon movement of said actuator from said second to said fourth position, means for selectively shifting said bail member between said first and second positions and means for selectively reciprocating said bail member between either of said first and second positions and said third position.

10. The combination according to claim 9 further comprising indicating means for indicating the position of each of said switch actuators.

11. The combination according to claim 9 further comprising visual means for indicating the position of each of said switch actuators.

12. A switching mechanism comprising a switch having at least two different states, a switch actuator movable between at least a first and a second position, means for changing the state of said switch upon movement of said switch actuator from one of said positions to the other of said positions, a movable member shiftable between one initial position and another initial position, means for moving said switch actuator from said first position to said second position only in response to a predetermined movement of said movable member from said one initial position to a still further position, and means for selectively shifting said movable member between said initial positions.

13. The combination according to claim 12, further comprising a latch for retaining said switch actuator in said second position, and means for releasing said latch in response to a predetermined movement of said movable member from said still further position only.

References Cited in the file of this patent

UNITED STATES PATENTS

| | | |
|---|---|---|
| 1,963,346 | Baker | June 19, 1934 |
| 2,120,235 | Beattie et al. | June 14, 1938 |
| 2,654,812 | Cunningham et al. | Oct. 6, 1953 |
| 2,822,440 | Karlsson | Feb. 4, 1958 |
| 2,863,960 | Martin | Dec. 9, 1959 |